US011736837B2

(12) United States Patent
Kaushal et al.

(10) Patent No.: US 11,736,837 B2
(45) Date of Patent: *Aug. 22, 2023

(54) ORIGINATION AND DESTINATION BASED ROUTING

(71) Applicant: Comcast Cable Communications, LLC, Philadelphia, PA (US)

(72) Inventors: Arvind Kaushal, Marlton, NJ (US); Jon Boone, Coatesville, PA (US); Brett Sherman, Philadelphia, PA (US); Richard Wikoff, Yardley, PA (US); Jaime Jimenez, Tinton Falls, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 610 days.

This patent is subject to a terminal disclaimer.

(21) Appl. No.: 16/442,777

(22) Filed: Jun. 17, 2019

(65) Prior Publication Data

US 2020/0112775 A1 Apr. 9, 2020

Related U.S. Application Data

(63) Continuation of application No. 15/280,178, filed on Sep. 29, 2016, now Pat. No. 10,368,145, which is a
(Continued)

(51) Int. Cl.
*H04Q 3/02* (2006.01)
*H04M 3/42* (2006.01)
(Continued)

(52) U.S. Cl.
CPC ........... *H04Q 3/02* (2013.01); *H04L 65/1016* (2013.01); *H04L 65/1069* (2013.01);
(Continued)

(58) Field of Classification Search
None
See application file for complete search history.

(56) References Cited

U.S. PATENT DOCUMENTS 5,781,620 A * 7/1998 Montgomery ........ H04M 15/00
379/114.01
6,163,597 A 12/2000 Voit
(Continued)

FOREIGN PATENT DOCUMENTS

| WO | 2005/112420 A1 | 11/2005 |
| WO | 2007042620 A1 | 4/2007 |
| WO | 2010073058 A1 | 7/2010 |

OTHER PUBLICATIONS

Mar. 5, 2020—Canadian Office Action—CA 2,812,571.
(Continued)

*Primary Examiner* — Nafiz E Hoque
(74) *Attorney, Agent, or Firm* — Banner & Witcoff, Ltd.

(57) ABSTRACT

One or more aspects of the disclosure relate to various functions and processes related to routing of calls based on origination and/or destination information. In one aspect, a method may comprise receiving a request for a call session, and the request may include an indicator that may indicate whether to route a call based on origination and/or destination information of the call session. Based on the indicator, a routing element may determine whether the call session should be routed based on origination information and/or destination information.

18 Claims, 10 Drawing Sheets

Related U.S. Application Data continuation of application No. 13/447,699, filed on Apr. 16, 2012, now Pat. No. 9,485,548, which is a continuation-in-part of application No. 12/913,634, filed on Oct. 27, 2010, now Pat. No. 8,442,205.

(51) Int. Cl.
*H04L 65/1016* (2022.01)
*H04L 65/1069* (2022.01)
*H04L 65/1096* (2022.01)
*H04L 65/1104* (2022.01)
*H04Q 3/66* (2006.01)

(52) U.S. Cl.
CPC ...... *H04L 65/1096* (2013.01); *H04L 65/1104* (2022.05); *H04M 3/42059* (2013.01); *H04M 3/42306* (2013.01); *H04Q 3/66* (2013.01); *H04M 2203/15* (2013.01); *H04M 2203/158* (2013.01); *H04Q 2213/13103* (2013.01); *H04Q 2213/13541* (2013.01)

(56) References Cited

U.S. PATENT DOCUMENTS

| | | | |
|---|---|---|---|
| 6,977,933 B2 * | 12/2005 | Soncodi | H04M 7/006 370/392 |
| 7,804,816 B2 | 9/2010 | Low et al. | |
| 8,571,015 B2 | 10/2013 | Ku | |
| 9,485,548 B2 | 11/2016 | Kaushal et al. | |
| 2002/0196918 A1 | 12/2002 | Culli et al. | |
| 2005/0243796 A1 | 11/2005 | Cope et al. | |
| 2005/0249196 A1 | 11/2005 | Ansari et al. | |
| 2006/0035623 A1 | 2/2006 | Senn et al. | |
| 2008/0186985 A1 * | 8/2008 | Sheth | H04L 65/1016 370/401 |
| 2009/0003561 A1 | 1/2009 | Patel | |
| 2009/0010168 A1 * | 1/2009 | Yurchenko | H04L 47/11 370/237 |
| 2009/0245179 A1 | 10/2009 | Liu et al. | |
| 2011/0149750 A1 | 6/2011 | Sharma et al. | |
| 2011/0270766 A1 | 11/2011 | Ramakrishnan et al. | |

OTHER PUBLICATIONS

EP search Report—EP11186315—Date of completion of search May 29, 2012.
Extended European Search Report—EP13163865.2—dated Jul. 26, 2013.
European Office Action—EP App 11183821.5—dated Jan. 16, 2015.
European Search Report—EP 15176141.8—dated Oct. 7, 2015.
Oct. 5, 2017—Canadian Office Action—CA 2,756,370.
Feb. 12, 2019—Canadian Office Action—CA 2,812,571.
Jun. 20117—Gurbani et al., RFC 4904: Representing Trunk Groups in tel/sip Uniform Resource Indentifiers (URIs).

* cited by examiner

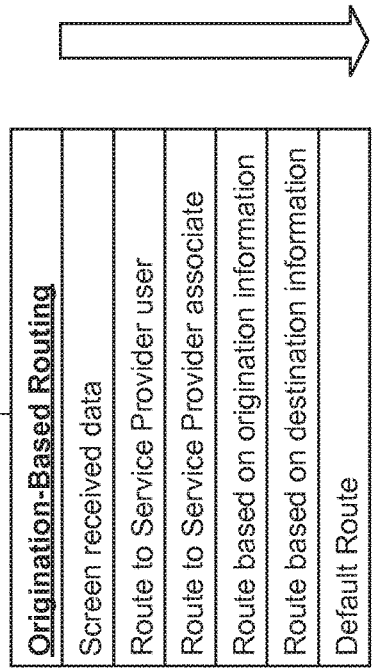
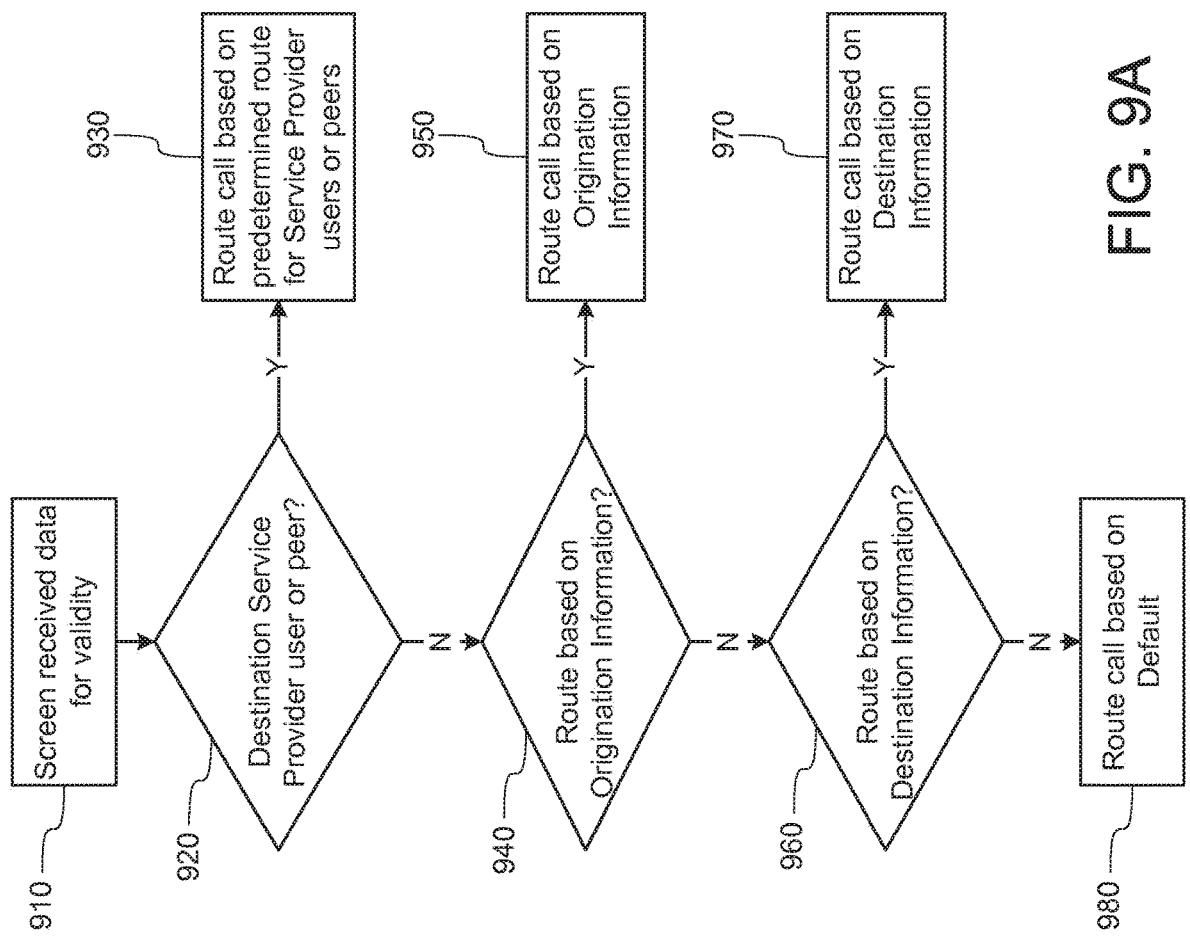
FIG. 9B
FIG. 9A

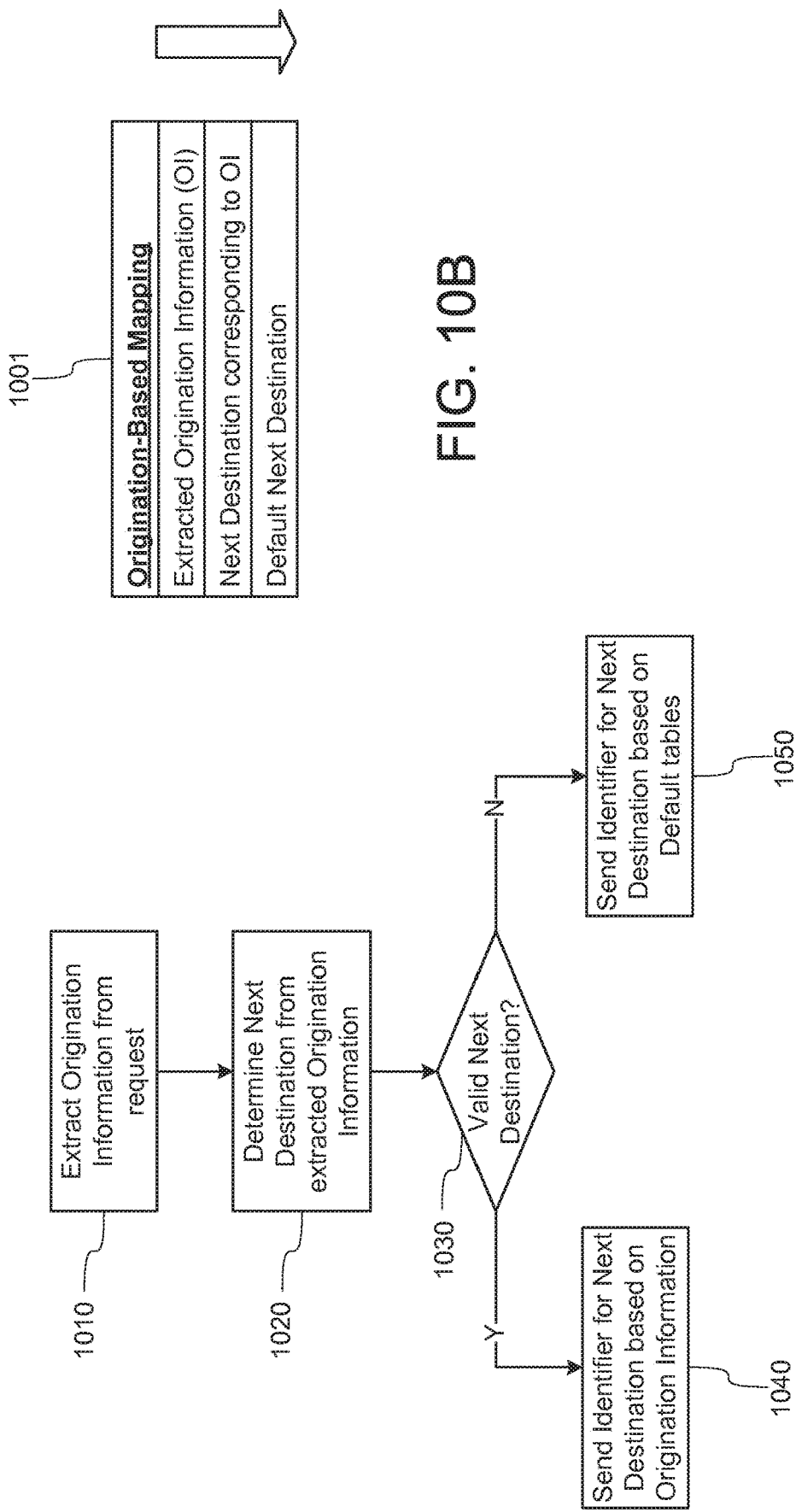

ORIGINATION AND DESTINATION BASED ROUTING

CROSS-REFERENCE TO RELATED APPLICATIONS

This application is a continuation of U.S. patent application Ser. No. 15/280,178, filed Sep. 29, 2016, which is a continuation of U.S. patent application Ser. No. 13/447,699, filed Apr. 16, 2012, which is a continuation-in-part of U.S. patent application Ser. No. 12/913,634, filed Oct. 27, 2010, each of which is herein incorporated by reference in its entirety.

BACKGROUND

Telephony systems typically route calls based on called party information, such as a destination number, and also sometimes implement routing policies based on load balancing for call traffic management. However, these systems are not sufficiently flexible or efficient in some situations. For example, where users are re-homed from a first sub-network to another sub-network within a carrier's network, destination-based routing with load balancing or other similar policies for traffic distribution and resource management may be inadequate. Moreover, interconnections between two or more carriers may be significantly impacted due to traffic shifts that occur when internal subscriber migrations occur within a carrier's network. Such traffic shifts may typically result in the need for additional trunking infrastructure to cater to the traffic pattern shifts, which can be costly and time consuming to implement.

SUMMARY

Some aspects of the disclosure relate to methods, apparatuses, and software for managing routing of calls to and from a network. Such routing management may be robust, adaptable, and/or customizable, and may potentially limit negative effects of call routing network modifications on existing networks. For instance, such routing may provide a two-phased query approach to search routing data, such as routing tables, based on origination and destination. The routing tables may be partitioned in a way that allows for different tables to be used for either origination or destination based routing.

Accordingly, one or more aspects of the disclosure may relate to various functions and process related to routing of calls to a network based on, e.g., origination of a call. For example, a method may include receiving, at a routing computing device, a call session request, the call session request including an indicator. The method may further include determining, based on the indicator, whether the call session request should be routed based on origination information of the call session request. In response to determining that the call session request should be routed based on the origination information of the call session request, the method may further include sending a first request for information identifying a next destination for the call session request, wherein the information identifying the next destination is determined based on the origination information of the call session request. Furthermore, the method may include receiving, at the routing computing device, information identifying a location having the information identifying the next destination for the call session request, in response to sending the first request. The method may also include receiving, responsive to the second request, the information identifying the next destination for the call session request and routing the call session request to the identified next destination.

In another aspect of the disclosure, a next destination may include a call management element connected to at least one communication trunk of a public switched telephone network, the at least one communication trunk corresponding to the origination information of the call session request. Furthermore, origination information of a call session request may include, for example, (1) call session request telephone number information, (2) call session request origin directory number information, (3) rate center information, (4) local routing number information, and/or (5) a unique trunk group identifier. In still further aspects of the disclosure, an indicator used to indicate origination and/or destination based routing may include a header field of a session initiation protocol (SIP) request, such as a trunk group header field.

One or more aspects of the disclosure also relate to various functions and process related to routing of calls to a network based on destination of the call. For example, a method for routing may further include sending a first request for information identifying a next destination for a call session request. The information identifying the next destination may be determined based on the destination information of the call session request in response to determining that the call session request should be routed based on destination information of the call session request.

One or more additional aspects of the disclosure relate to various apparatuses configured determine a destination of a call session. For example, an apparatus may include one or more non-transitory computer-readable media storing first information identifying a mapping database for origination-based routing and second information identifying a first call management element for destination-based routing. The apparatus may further include a processor configured to receive a first request associated with a call session request and determine, based on the first request, whether to route the call session request to the mapping database or to the first call management element. A processor of an apparatus may further be configured to in response to determining that the origination information corresponds to the, send a response identifying the mapping database. Additionally, the processor of an apparatus may be configured to send a response identifying the first call management element in response to determining that the origination information does not correspond to the first information. The processor of an apparatus may further be configured to send a response identifying the first call management element in response to determining that the origination information does not correspond to the first information.

In further aspects of the disclosure, one or more non-transitory computer-readable media of an apparatus may store a mapping database, wherein the mapping database associates a plurality of call management elements with one or more call session request origins. The processor of the apparatus may further be configured to receive a second request including origination information of the call session request and based on the origination information, identify, from the mapping database a second call management element from the plurality of call management elements.

The preceding presents a simplified summary in order to provide a basic understanding of some aspects of the disclosure. The summary is not an extensive overview of the disclosure. It is neither intended to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

The present disclosure is illustrated by way of example and not limited in the accompanying figures in which like reference numerals indicate similar elements and in which:

FIG. 9A illustrates an example method for using an origination-based routing data according to one or more aspects described herein.

FIG. 9B illustrates an example origination-based routing data according to one or more aspects described herein.

FIG. 10A illustrates an example method for using origination-based mapping according to one or more aspects described herein.

FIG. 10B illustrates an example origination-based mapping according to one or more aspects described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1A:
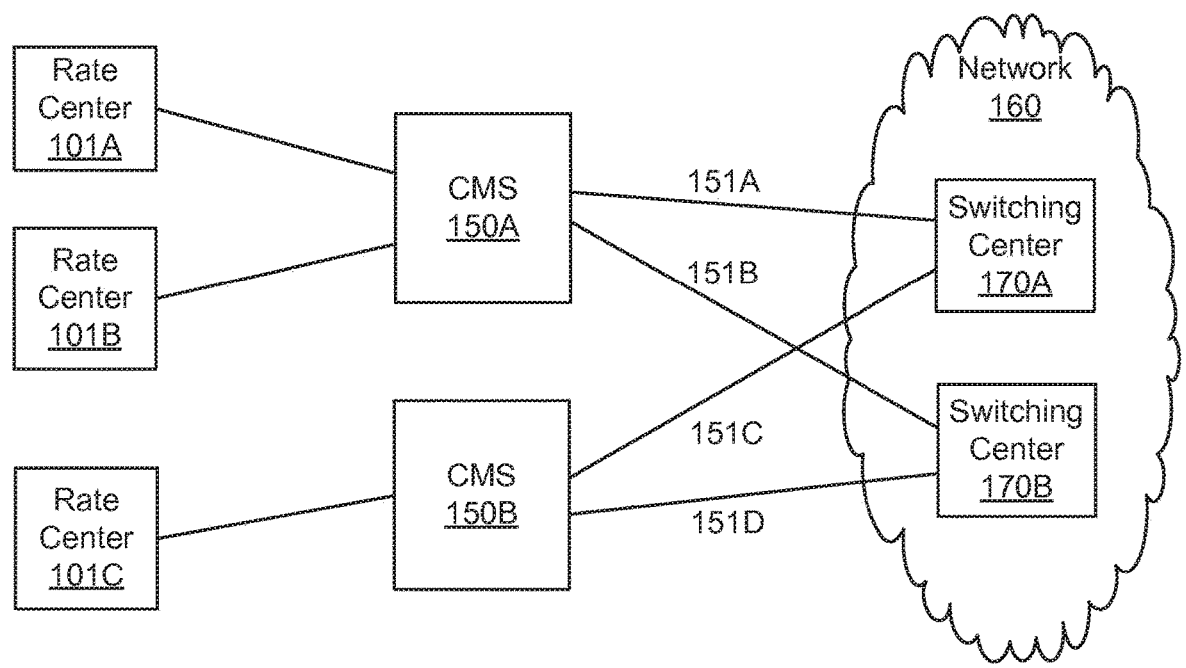
FIG. 1A illustrates an example system through which calls may be routed to a network according to one or more aspects described herein.
Figure 1B:
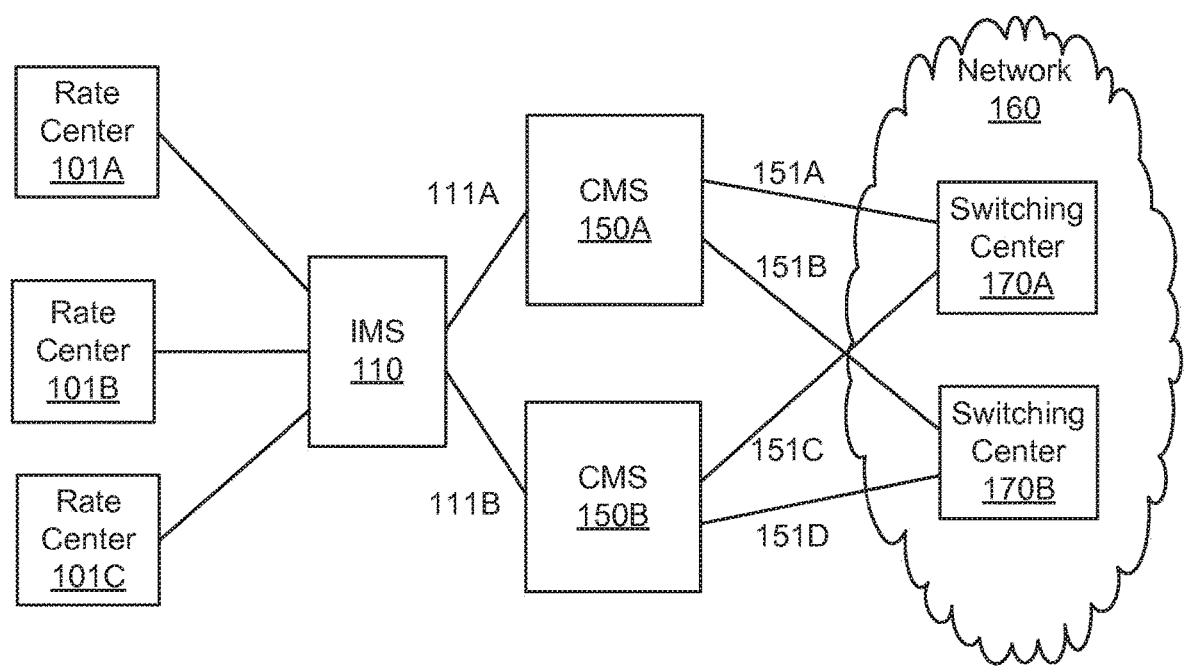
FIG. 1B illustrates another example system through which calls may be routed to a network according to one or more aspects described herein.

FIG. 1A illustrates an example system through which calls may be routed according to one or more aspects described herein. FIG. 1B illustrates another example system through which calls may be routed according to one or more aspects described herein. The example systems of FIGS. 1A and 1B may include rate centers 101A, 101B and 101C and call management computing devices such as servers (CMSs) 150A and 150B. Three rate centers and two CMSs are included for illustrative purposes, and each example system may include any number of rate centers and/or CMSs. Each grouping identified by each rate center 101A-C may include a plurality of users, telephones and/or telephone numbers. Furthermore, each rate center may include a plurality of users, telephones and/or telephone numbers in a particular geographic area. Calls within a rate center 101A, 101B or 101C may be considered, for example, local calls, whereas calls made from one rate center to another rate center may be considered, for example, long-distance calls. However, this is not always the case. One having ordinary skill in the art would appreciate that elements 101A-C may alternatively represent individual users, telephones and/or telephone numbers.

CMSs 150A and 150B may route one or more calls originating from one or more rate centers 101A, 101B and 101C to a network 160, such as a public switched telephone network (PSTN) or another external network such as a VoIP network. CMSs 150A and 150B may include switches that route calls from rate centers 101A-C to switching centers 170A and 170B located in or associated with network 160. In some embodiments, switching centers 170A and 170B may represent local exchange carriers (LECs), such as local telephone companies. In other embodiments, switching centers 170A and 170B may connect CMSs 150A and 150B to LECs.

CMSs 150A and 150B may be connected to switching centers 170A and 170B located in network 160 through one or more trunk groups (e.g., elements 151A, 151B, 151C and 151D). Each trunk group may further include one or more trunks. Each trunk may be shared by multiple users, telephones, telephone numbers and/or rate centers. For example, each trunk 151A-D may represent a shared communication channel, such as one or more physical lines and/or communication frequencies.

In the example system of FIG. 1A, rate centers 101A, 101B and 101C may be connected directly to CMSs 150A and 150B. Alternatively, rate centers 101A-C may be connected indirectly to CMSs 150A and 150B, such as by being connected to other hardware and/or software devices and/or communication links, which in turn may be connected to CMSs 150A and 150B. For example, as will be further described with respect to FIG. 2, call sessions originating from rate centers 101A-C may route through one or more Internet Protocol (IP) Multimedia Subsystem (IMS) 210, route proxy 230, routing database 240, and/or other route proxies or routing databases before reaching CMSs 150A and 150B. In the example systems of FIGS. 1A and 1B, each rate center 101A-C may be associated with (e.g., served by) one or more CMS 150A and 150B. For example, rate centers 101A and 101B may be associated with CMS 150A, whereas rate center 101C may be associated with CMS 150B. In the present example, CMS 150A may route call sessions originating from rate centers 101A and 101B to network 160, whereas CMS 150B may route calls originating from rate center 101C to network 160. Therefore, in the example system of FIG. 1A, call sessions may, by default, be routed based on origination information (e.g., identifiers for rate centers 101A-C) because each rate center 101A-C may be associated with one or more CMS 150A-B in a predetermined manner.

The example system of FIG. 1B shows an Internet Protocol (IP) Multimedia Subsystem (IMS) 110. In this example, each rate center 101A, 101B and 101C may be connected directly to IMS 110. Similar to the example system of FIG. 1A, rate centers 101A-C may be alternatively connected to other hardware and/or software structures, which in turn may be connected to IMS 110. IMS 110 may further be connected to CMSs 150A and 150B, via communication links 111A and 111B. Additional hardware and software structures may be included between IMS 110 and CMSs 150A and 150B. For example, as will be further described with respect to FIG. 2, structures may include route proxy 230, routing database 240, and/or other hardware or software structures.

In some embodiments, the example system of FIG. 1A may represent a pre-migration call routing system, and the example system of FIG. 1B may represent a post-migration call routing system. A service provider may prefer that a migration (e.g., a change in telephony infrastructure) from an example call routing system of FIG. 1A to an example call routing system of FIG. 1B remain transparent to, for example, network 160. In particular, a service provider may prefer a call originating from one of rate centers 101A-C that routes through a particular trunk or trunk group 151A-D in the example system of FIG. 1A (e.g., pre-migration) to route through the same trunk or trunk group 151A-D in the example system of FIG. 1B (e.g., post-migration). For example, a service provider may prefer a call session originating from rate center 101A to route through CMS 150A and trunk group 151A to switching center 170A. In the example system of FIG. 1A (e.g., pre-migration), call sessions originating from rate center 101A may, by default, route through CMS 150A to switching center 170A, via trunk group 151A, because rate center 101A is associated directly with CMS 150A. On the other hand, in the example system of FIG. 1B (e.g., post-migration), call sessions originating from rate center 101A might not, by default, route through CMS 150A, because rate center 101A is connected to IMS 110, but not necessarily to CMS 150A. Therefore, in order for a call session originating from rate center 101A to route through CMS 150A in the example system of FIG. 1B (post-migration), the system may use origination information for rate center 101A. Origination information may mask changes made to a service provider's call routing system (e.g., IMS 110 and CMSs 150A-B) from, for example, network 160 and/or network interfaces. Therefore, origination-based routing may be advantageously used to limit the effect of changes to a service provider's infrastructure on, for example, network 160 and/or network interfaces. Such advantages may be achieved by routing calls to interfaces (e.g., trunk groups) and/or networks (e.g., PSTN) expected by carriers, providers, and/or networks.

In the example systems of FIGS. 1A and 1B, CMSs 150A and 150B may include a predetermined amount of resources (e.g., one or more elements 151A, 151B, 151C and 151D) to handle one or more calls. For example, CMS 150A may include at least enough resources to handle anticipated call volumes originating from rate center 101A and passing through switching center 170A, originating from rate center 101A and passing through switching center 170B, originating from rate center 101B and passing through switching center 170A, and originating from rate center 101B and passing through switching center 170B. Additionally, CMS 150B may include at least enough resources to handle anticipated call volumes originating from rate center 101C and passing through switching center 170A and originating from rate center 101C and passing through switching center 170B. In other examples, CMSs 150A and 150B may include enough resources to handle calls originating from any rate center 101 and passing through any switching center 170. For example, CMS 150A and CMS 150B may each include enough resources to handle anticipated call volumes originating from rate centers 101A, 101B, or 101C and passing through switching centers 170A or 170B.

Origination-based routing as herein described is not limited to routing calls to a PSTN and may be used in any other system and/or network that routes information and/or data. For example, origination-based routing may be applied to Internet Protocol (IP) routing (e.g., VoIP). Origination information used in IP origination-based routing may include, for example, a data originator's IP address. Furthermore, origination-based routing is not limited to calls and may be used to route information and/or other content (e.g., audio, video, data, etc., such as instant messages, text messages, images, and voice mail) in any type of network, including, but not limited to, analog or digital networks, coaxial cable networks, optical fiber networks, hybrid fiber/coax networks (HFC), cellular telephone wireless networks, local wireless networks (e.g., WiMAX), satellite networks, etc.

Figure 2:
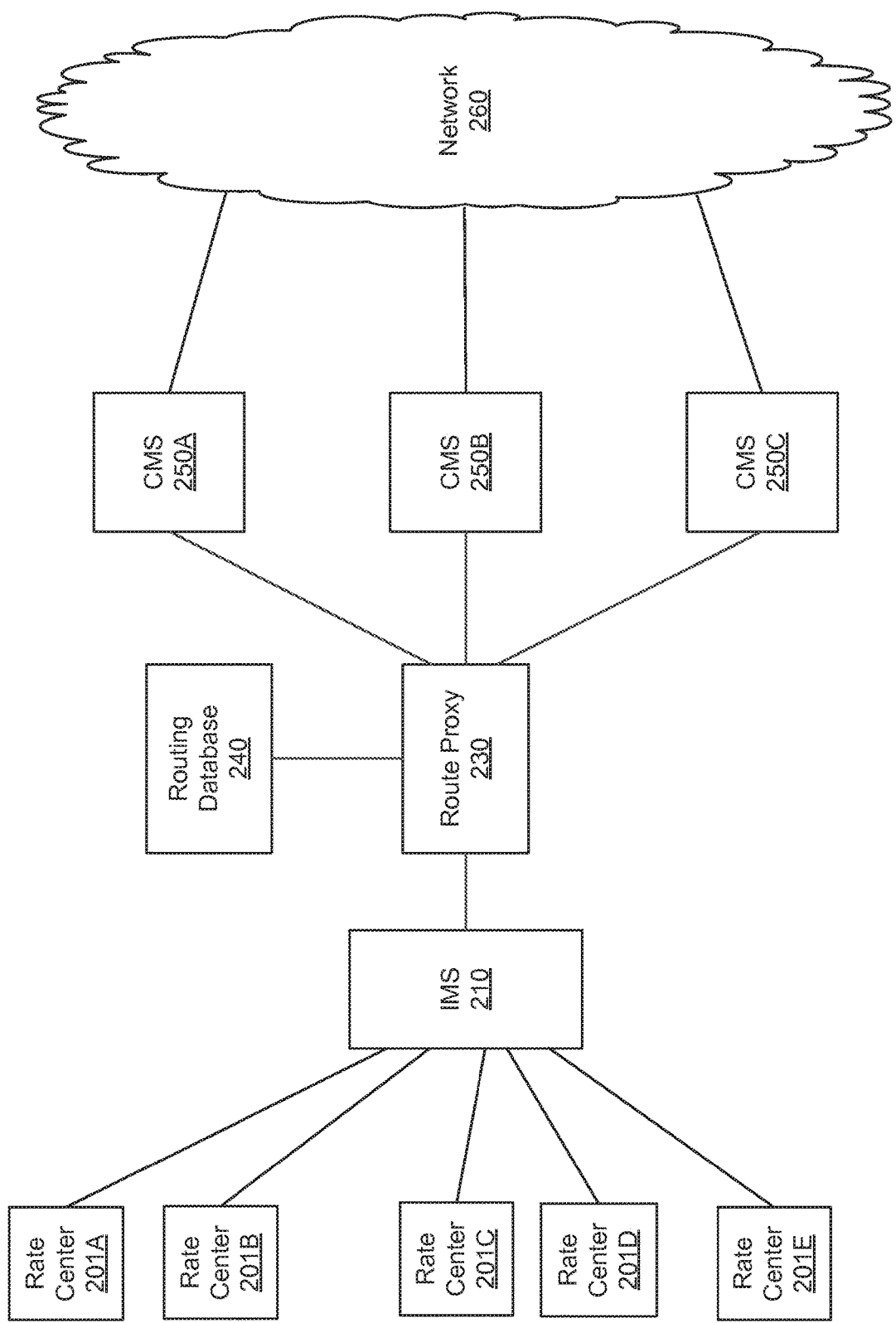
FIG. 2 illustrates an additional example system through which calls may be routed to a network according to one or more aspects described herein.

FIG. 2 illustrates an example system through which calls may be routed to a network according to one or more aspects described herein. In particular, FIG. 2 may provide more detail to the example call routing system shown in FIG. 1B and previously described. The example system of FIG. 2 may include rate centers 201A-E, Internet Protocol (IP) Multimedia Subsystem (IMS) 210, one or more route proxies (e.g., route proxy 230), one or more routing databases (e.g., routing database 240) and/or call management servers (CMSs) 250A-C. As illustrated in FIG. 2, components of a call routing system may communicate with each other and/or with other devices and/or networks 260, such as a PSTN, other on-net and off-net networks (not shown), and/or other service providers (not shown). Furthermore, the devices of FIG. 2 may be configured to communicate using one or more Internet Protocol-based communication protocols, such as session initiation protocol (SIP) or extensible messaging and presence protocol (XMPP). The details of an example embodiment utilizing SIP will be discussed below.

Figure 3:
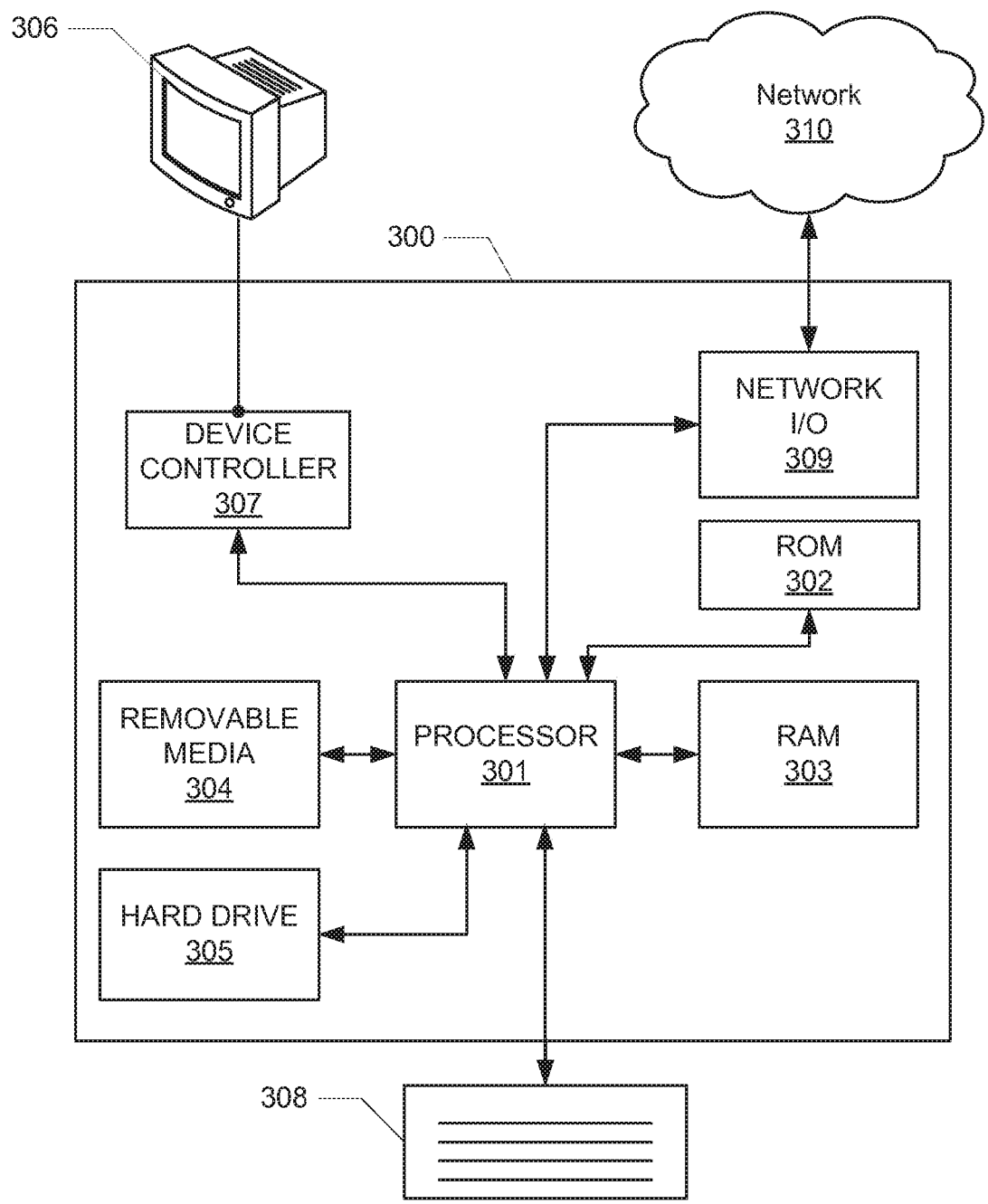
FIG. 3 illustrates an example computing device on which the various elements described herein can be implemented.

FIG. 3 illustrates an example computing device and/or software on which any of the various elements described herein can be implemented. The computing device 300 may include one or more processors 301, which may execute instructions of a computer program to perform any of the features described herein. The instructions may be stored in any type of computer-readable medium, to configure the operation of the processor 301. For example, instructions may be stored in a memory such as a read-only memory (ROM) 302 or random access memory (RAM) 303, removable media 304 such as a Universal Serial Bus (USB) drive, compact disk (CD) or digital versatile disk (DVD), floppy disk drive, or any other desired non-transitory and/or tangible storage medium. Instructions may also be stored in an attached (or internal) hard drive 305. The computing device 300 may include one or more output devices, such as a display 306 (or an external television), and may include one or more output device controllers 307, such as a video processor. There may also be one or more user input devices 308, such as a remote control, keyboard, mouse, touch screen, microphone, etc. The computing device 300 may also include one or more network interfaces, such as input/output circuits 309 (such as a network card) to communicate with a network 310 (e.g., network 160 or 260) and/or directly with another device. The network interface may be a wired interface, wireless interface, or a combination of the two. In some embodiments, the interface 309 may include a modem (e.g., a cable modem), and network 310 may include the communication lines of the networks previously described (e.g., PSTN, wholesale carrier, telephony carrier, VoIP carrier, etc.). In further examples, the interface 309 may include an Ethernet connection, a universal serial bus (USB) port, a wireless connection, or any other type of communication port.

The FIG. 3 example is an illustrative hardware configuration. Modifications may be made to add, remove, combine, divide, etc. components as desired. Additionally, the components illustrated may be implemented using basic computing devices and components, and the same components (e.g., processor 301, storage 302, user interface, etc.) may be used to implement any of the other computing devices and components described herein.

One or more aspects of the disclosure may be partially or fully embodied in computer-usable data and/or computer-executable instructions, such as in one or more program modules, executed by one or more computing devices or other devices. Generally, program modules may include one or more routines, programs, objects, components, and/or data structures, etc. that perform particular tasks or implement particular abstract data types when executed by a processor in a computing device. The computer executable instructions may be stored on one or more computer readable media such as a hard disk, optical disk, removable storage media, memory, etc. As will be appreciated by one of skill in the art, the functionality of the program modules may be combined or distributed as desired in various embodiments. In addition, the functionality may be embodied in whole or in part in firmware and/or hardware equivalents such as integrated circuits, field programmable gate arrays (FPGA), and the like. Particular data structures may be used to more effectively implement one or more aspects as described herein, and such data structures are contemplated within the scope of computer executable instructions and computer-usable data described herein.

Figure 4:
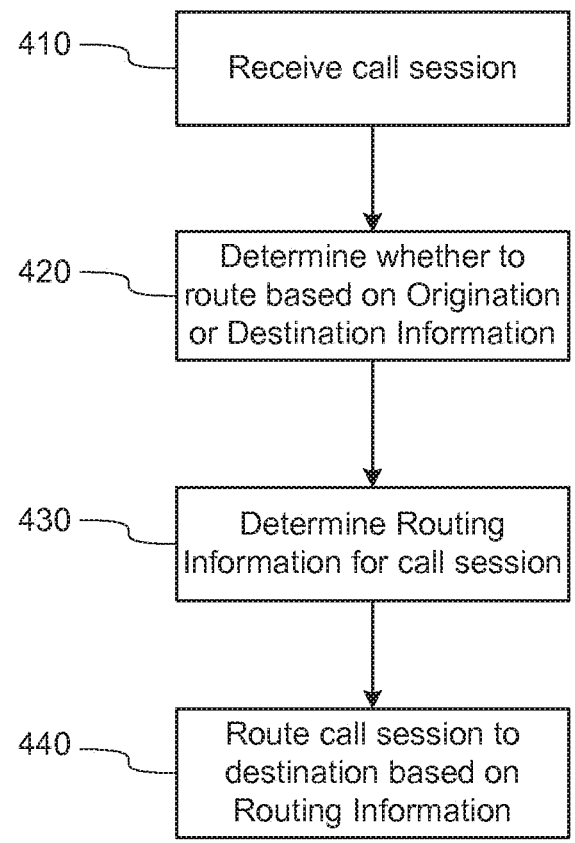
FIG. 4 illustrates an example method for routing a call session based on routing information according to one or more aspects described herein.

FIG. 4 illustrates an example method for routing a call session based on routing information according to one or more aspects described herein. For illustrative purpose only, the method will be discussed with reference to the system of FIG. 2. In step 410, route proxy 230, for example, may receive a call session initiation request including an identifier identifying whether to route a call session based on origination or destination information. In step 420, route proxy 230, in conjunction with routing database 240, may use a received identifier to determine whether to route a call session based on origination information or destination information. In step 430, route proxy 230 may use routing database 240 to determine the next destination of the call session based on origination or destination information. A next destination may include, e.g., one of call management servers 250A-C. In step 440, route proxy 230 may route a call session to the next destination (e.g., one of call management servers 250A-C) determined in determining step 430. FIG. 4 illustrates an overview call routing method, and example call routing methods will be described more fully with respect to FIGS. 5-10.

Figure 5:
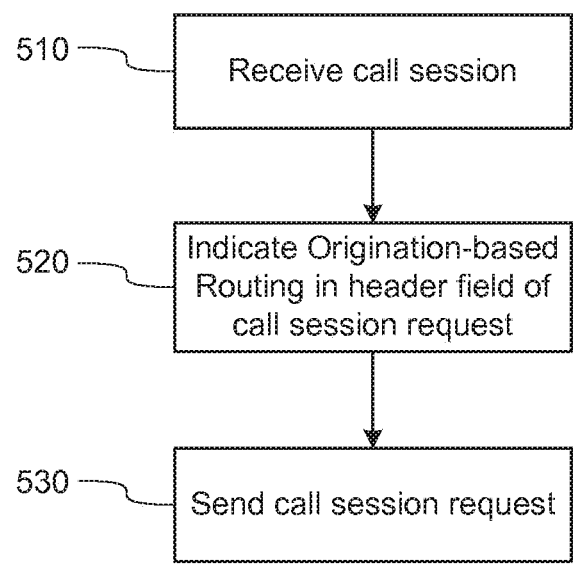
FIG. 5 illustrates an example method for indicating origination-based routing for a call session according to one or more aspects described herein.

FIG. 5 illustrates an example method for indicating origination-based routing for a call session according to one or more aspects described herein. Some or all of the steps illustrated in FIG. 5 may, in certain embodiments, be performed by IMS 210. IMS 210 may be configured to receive a call session (e.g., a call session initiation request) from rate centers 201A-E. In step 510, IMS 210 may receive a call session (e.g., a call session initiation request) from one of rate centers 201A-E. Each rate center 201A-E may include multiple users, telephones and/or telephone numbers, so a call session request may ultimately originate from one or more users, telephones and/or telephone numbers. For purposes of the following description, call sessions will be indicated as originating from one of rate centers 201A-E. However, one of ordinary skill in the art will appreciate that call sessions may originate, for example, from one or more users, telephones, telephone numbers, and/or rate centers. A user in one of rate centers 201A-E may initiate a call session, for example, by dialing a destination phone number. One or more origination identifiers and/or other information may be associated with a rate center 201A-E. For example, origination identifiers may include a telephone number, a directory number, information identifying a rate center, IP address, a local routing number, and/or a unique trunk group identifier. Furthermore, origination identifiers may be predetermined (e.g., assigned), for example, by a service provider associated with a user, telephone, telephone number and/or rate center 201A-E. Similar identifiers may also be assigned to destination users, telephones, telephone numbers and/or rate centers (not shown).

IMS 210 may further be configured to add a new indicator or modify an existing indicator in a received call session request to indicate whether a call session should be routed based on origination information or destination information. In step 520, IMS 210 may indicate in a header and/or data field of a received call session request whether to route a call session based on origination information or destination information. For example, IMS 210 may add a new header or modify an existing header, such as a trunk group (TGRP) header field, included in a session initiation protocol (SIP) call session initiation request. A trunk group header value of 1001 may indicate, for example, that origination-based routing should be attempted, whereas a trunk group header value of 1000 may indicate, for example, that destination-based routing should be attempted. One of ordinary skill in the art would recognize that any form of identifier may be used so long as an identifier indicating origination-based routing differs from an identifier indicating destination-based routing. An indicator for origination or destination-based call routing need not be included in a trunk group header field and may be included in any field of a SIP call session initiation request. For example, an indicator may be included in a P-asserted-identity header field, a From header field, or a Diversion header field. Furthermore, the indicator need not be included in a header field, but may be included in any data field of a call session initiation request.

Headers (e.g., a TGRP header) or other data fields included in a call session request may also be used to indicate the type of call for a call session. Call types include, but are not limited to, local, toll, long distance, and international calls. For example, a trunk group header value of 1001 may indicate that the call is a local call and that origination-based routing should be attempted. A trunk group header value of 2001, on the other hand, may indicate that the call is a toll call and that origination-based routing should be attempted. Call session header and data fields may also be advantageously used to indicate any other characteristic or feature of the call session.

IMS 210 may further be configured to forward a received call session to the next destination (e.g., hop) in a call route, as illustrated, for example, in step 530. The forwarded call session may include an appended or modified header or data field indicating, for example, origination or destination-based routing and/or call type. In some embodiments, IMS 210 may forward the call session to a route proxy 230. In other embodiments, IMS 210 may forward the call session to an intermediate device, such as a universal gateway controller. The intermediate device may subsequently forward the call session to route proxy 230, with or without modifying the header and/or data fields of the call session.

Figure 6:
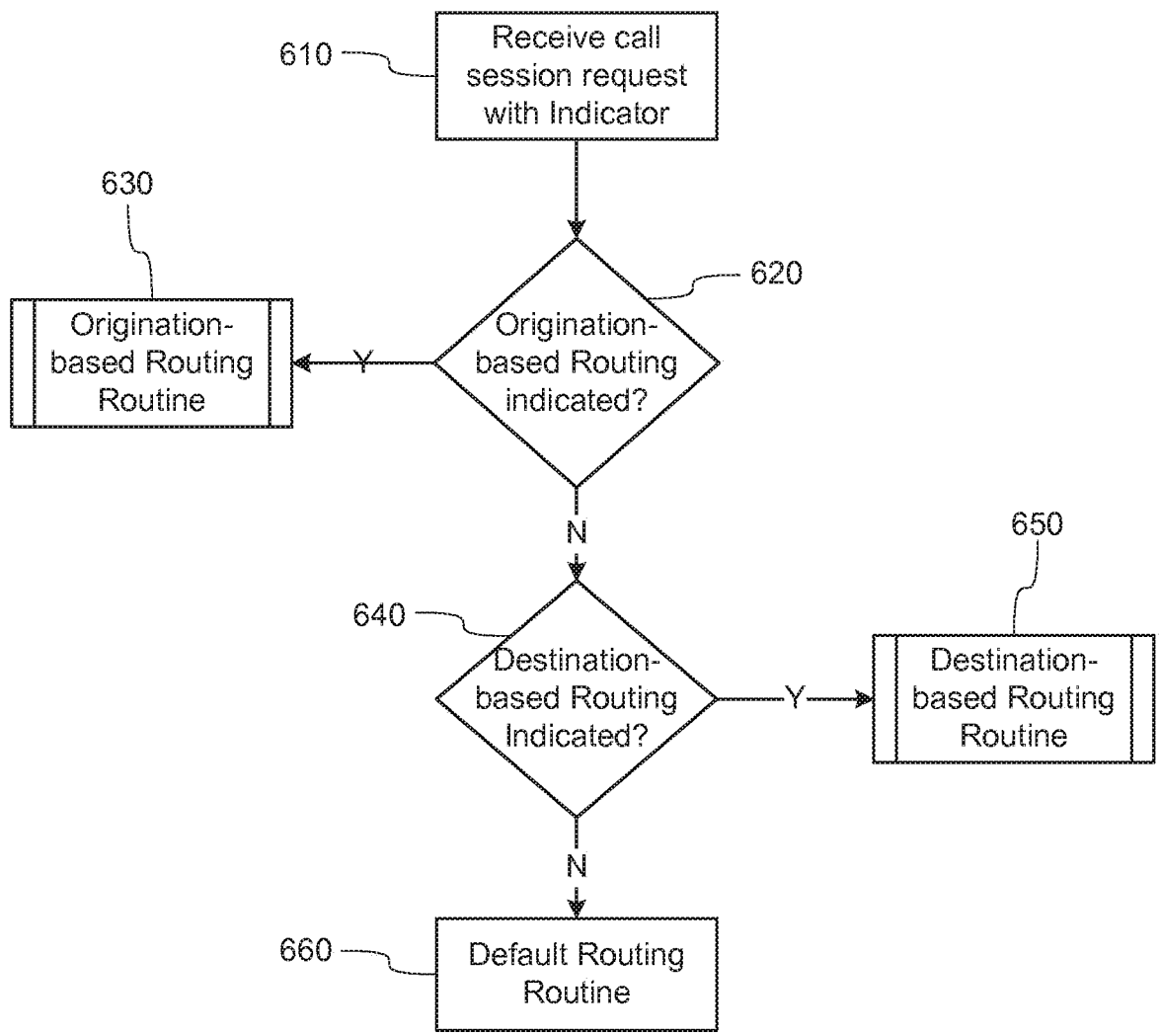
FIG. 6 illustrates an example method for determining routing based on an indicator according to one or more aspects described herein.
Figure 7:
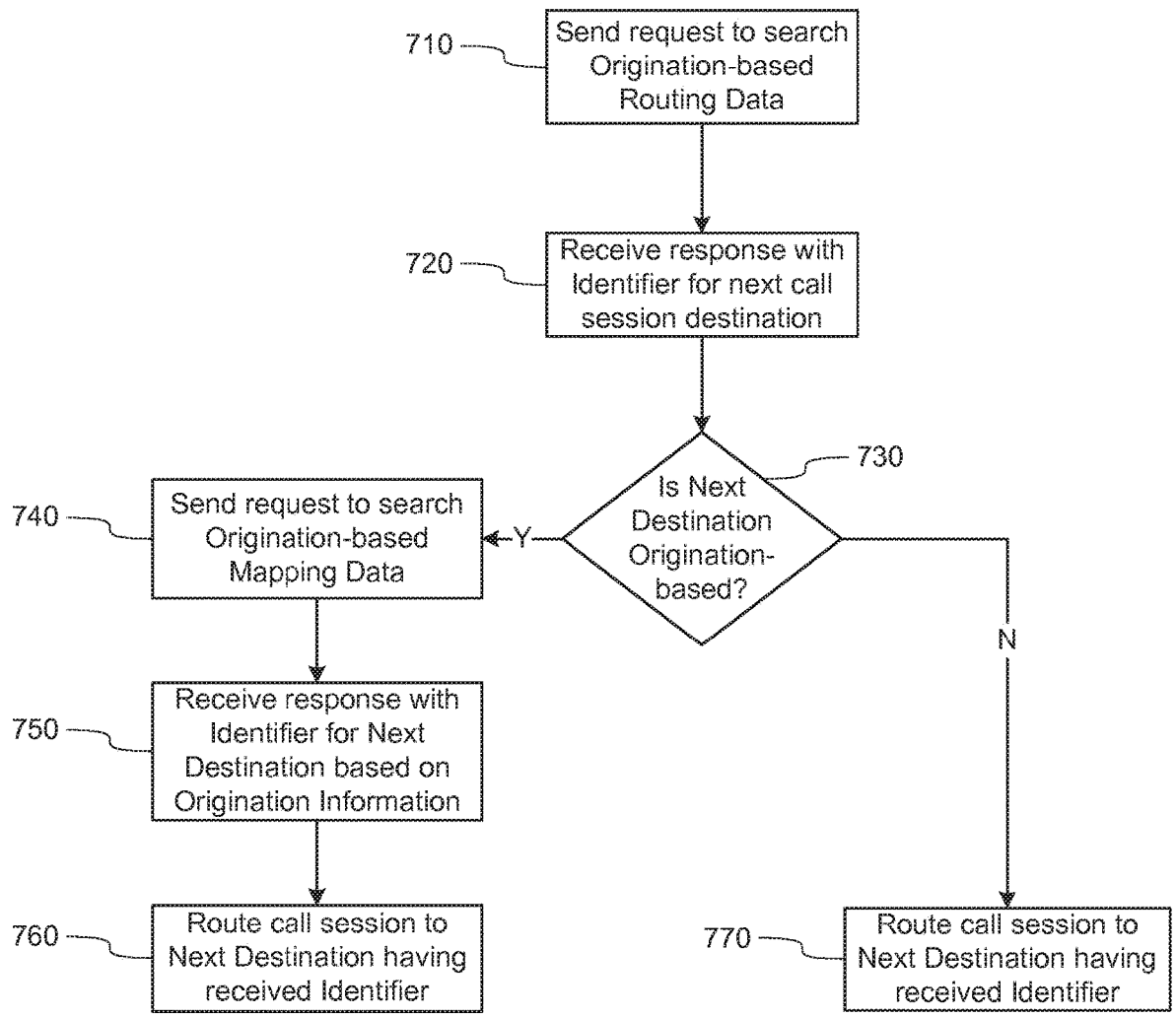
FIG. 7 illustrates an example method for performing origination-based routing according to one or more aspects described herein.
Figure 8:
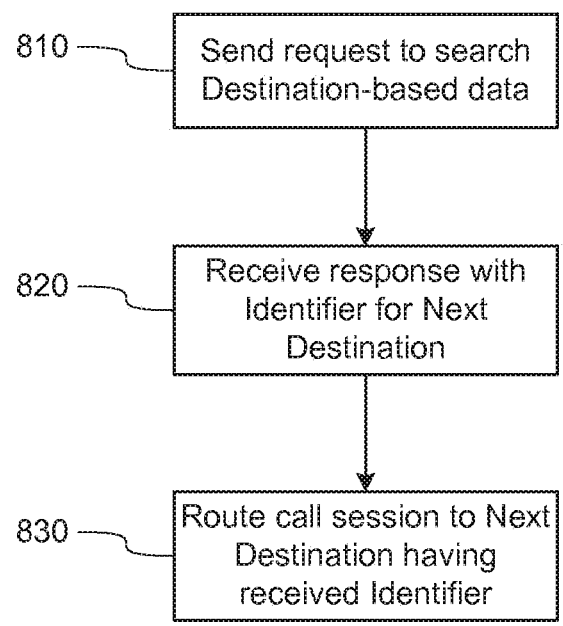
FIG. 8 illustrates an example method for performing destination-based routing according to one or more aspects described herein.

FIGS. 6-8 illustrate example methods for receiving a call session and indicator(s), determining the next routing destination for a received call session based on a received indicator(s), and forwarding a call session to the next routing destination. The steps illustrated in FIGS. 6-8 may be performed, for example, by route proxy 230. In some arrangements, the route proxy 230 may operate as a SIP routing proxy.

FIG. 6 illustrates an example method for determining routing based on an indicator according to one or more aspects described herein. Route proxy 230 may be configured to receive, from IMS 210, for example, a call session initiation request and/or any other information regarding a call session, as illustrated in step 610. A received call session initiation request may include an indicator (e.g., in a TGRP header) indicating whether to route the call session using origination or destination information. Route proxy 230 may also be configured to create a request for a routing database based on information received in the call session initiation request. For example, route proxy 230 may create a database query based on the value of a received indicator (e.g., indicator indicating origination or destination-based routing). Based on the received indicator, route proxy 230 may determine whether a call session should be partially or fully routed based on origination information or destination information.

In step 620, route proxy 230 may determine whether origination-based routing has been indicated. Route proxy 230 may read a received indicator (e.g., TGRP header value) to determine whether origination-based routing is preferred. For example, an indicator value of 1001 may indicate that origination-based routing is preferred. In step 630, if origination-based routing is preferred (as determined in step 620), route proxy 230 may perform an origination-based routing routine, as will be described more fully with respect to FIG. 7. In step 640, route proxy 230 may determine whether destination-based routing has been indicated. For example, an indicator value of 1000 may indicate that destination-based routing is preferred. In step 650, if destination-based routing is preferred (as determined in step 640), route proxy 230 may perform destination-based routing, as will be described more fully with respect to FIG. 8.

In step 660, if neither origination-based routing nor destination-based routing is indicated (step 620: No; step 640: No), route proxy 230 may attempt one or more default routing routines. Furthermore, route proxy 230 may perform one or more default routing routines if, for example, the route proxy 230 is unable to determine the type of routing preferred (e.g., error in header and/or data fields, inability to read header and/or data fields, etc.) Default routing routines may include, for example, routines based on call type (e.g., local, toll, long-distance, international, etc.), routines based on relationships between origination and destination service providers (e.g., a call originating from a number that is licensed/owned/assigned by service provider A destined for another number licensed/owned/assigned by service provider A or for a number that is licensed/owned/assigned by a service provider B), or least cost routing. Furthermore, route proxy 230 may attempt to perform one or more default routine prior to attempting to route based on origination or destination information, and one or more default routine after. Furthermore, default routines may be stored on the same or different routing database(s) 240 as the origination-based routines and destination-based routines.

FIG. 7 illustrates an example method for performing origination-based routing according to one or more aspects described herein. Route proxy 230 may be configured to interact with one or more routing database(s) (e.g., routing database 240) to determine a next call session destination. In step 710, route proxy 230 may send a request to search origination-based routing data, such as a data table, included in a routing database (e.g., routing database 240). An origination-based routing data table will be described more fully with respect to FIGS. 9A and 9B. Each request may further include origination and/or destination information (e.g., telephone number, directory number, rate center information, local routing number for origin rate center 201A-E or destination rate center, and/or a unique trunk group identifier).

In step 720, route proxy 230 may receive a response from routing database 240. Information received in the response may include, for example, information identifying a next destination for a call session request. Identifiers for a next destination may include, but are not limited to, a uniform resource identifier (URI), such as a uniform resource name (URN) or a uniform resource locator (URL), and/or a list of possible next destination(s) and/or routes. Identifiers may also include domain name information, such as a fully qualified domain name that indicates a location in a Domain Name System, an IP address, and/or other identifiers that route proxy 230 may use to identify a next destination, such as an identifier that is uniquely recognizable by route proxy 230. The received identifier may be used by the route proxy 230 to determine, for example, the next destination of the call (e.g., the next "hop" for the call). For example, an identifier received from routing database 240 may indicate one of CMSs 250A-C or another routing table/database as the next destination for a call.

In step 730, route proxy 230 may determine whether the next destination of a call is origination-based. For example, route proxy 230 may determine a next destination corresponding to a received identifier (e.g., URI, etc.). In step 740, if the identifier indicates that the next destination is origination-based (step 730: Yes), route proxy 230 may send a request to search origination-based mapping data, such as in a dedicated table. The request may further include information identifying a call session origin, such as a telephone number, directory number, rate center information, a local routing number, and/or a unique trunk group identifier. The information identifying a call session origin may be indicated in a header and/or other data field of the request message. If the request message is a SIP request, for example, call origin information may be included in one or more header fields of the SIP request, including, but not limited to, a trunk group header, a Diversion header, a P-asserted-identity (PAID) header, and a From header. Route proxy 230 may further read an identifier to determine the address and/or location of an origination-based mapping table. In some aspects of the disclosure, call session origin information might not be included in the route proxy request. For example, information identifying a call session origin may be stored in an origination information database, and a request to search an origination-based mapping table may include information, such as a pointer, that may be used to locate call session origin information stored in the origination information database. Origination-based mapping data (e.g., included in an origination-based mapping table) may be included in the same routing database as the origination-based routing data (e.g., routing database 240). Alternatively, the origination-based mapping data may be included in a routing database different from routing database 240. An origination-based mapping data table will be described more fully with respect to FIGS. 10A and 10B.

In step 750, the route proxy 230 may receive a response from the origination-based mapping table (e.g., routing database 240). The response may include, for example, an identifier (e.g., URI, URL, etc.) for the second destination (e.g., second "hop") of the call session. An indicated second destination may correspond to information identifying a call session origin sent to the origination-based mapping table by route proxy 230 (e.g., in step 740). In particular, the second destination may be a call management element (e.g., one of call management servers 250A-C) corresponding to the call session origin. Furthermore, an identified call management element may be connected, directly or indirectly, to a trunk or trunk group of network 260. Therefore, a call origin (e.g., one of rate centers 201A-E) may correspond to one or more trunks or trunk groups of network 260. In step 760, route proxy 230 may route the call session to the second destination (e.g., a CMS 250A-C) corresponding to the received identifier.

Prior to routing a call session to a second destination (e.g., one of CMSs 150A-C), route proxy 230 may modify an origination-based routing indicator (e.g., TGRP header), where the origination-based routing indicator may, for example, have been added to and/or modified in a call session header or data field by IMS 210, in step 520. In particular, route proxy 230 may reset an origination-based routing indicator to a value expected by CMSs 250A-C in order to, for example, take advantage of existing pre-migration infrastructure. A value expected by CMSs 250A-C may include, for example, a pre-migration value. For example, if origination-based routing was indicated (e.g., TGRP header value=1001), route proxy 230 may reset the indicator (e.g., TGRP header value=1000) prior to forwarding the call session to the indicated call management element.

If, in step 720, an identifier received with a response indicates that a next destination is not origination-based (step 730: No), route proxy 230 may, in step 770, route the call session to a next destination (e.g., a CMS 250A-C) corresponding to the received identifier, without first routing the call session to, for example, an origination-based mapping table.

FIG. 8 illustrates an example method for performing destination-based routing according to one or more aspects described herein. Route proxy 230 may be configured to interact with one or more routing database(s) (e.g., routing database 240) to determine a next call session destination. In step 810, route proxy 230 may send a request to search a destination-based routing table (e.g., a routing database 240). Destination-based routing data (e.g., included in a destination-based routing table) may, but need not, be located within the same routing database 240 as origination-based routing data tables and/or origination-based mapping data tables. Each request may further include origination and/or destination information (e.g., telephone number, directory number, rate center information, local routing number for origin rate center 201A-E or a destination rate center, and/or a unique trunk group identifier).

In step 820, route proxy 230 may receive a response from routing database 240. Information received in the response may include, for example, information (e.g., URI, URN, URL, etc.) identifying a next destination or a list of possible next destinations for a call session. The received identifier may be used by route proxy 230 to determine, for example, the next destination of the call (e.g., the next "hop" for the call). For example, an identifier received from routing database 240 may indicate one of CMSs 250A-C or another routing table and/or database as the next destination for a call. In step 830, route proxy 230 may route the call session to a next destination (e.g., a CMS 250A-C) corresponding to the received identifier.

Prior to routing a call session to an indicated next destination, route proxy 230 may modify a destination-based routing indicator (e.g., TGRP header), where the destination-based routing indicator may, for example, have been added to and/or modified in a call session header or data field by IMS 210, in step 520. In particular, route proxy 230 may reset the origination-based routing indicator to a value expected by CMSs 250A-C. A value expected by CMSs 250A-C may include, for example, a pre-migration value.

FIG. 9A illustrates an example method for using origination-based routing data (e.g., data table) according to one or more aspects described herein. FIG. 9B illustrates an example origination-based routing data (e.g., structure, configuration, organization, etc. of information) corresponding to the example method of FIG. 9A, according to one or more aspects described herein. The steps illustrated in FIG. 9A may be performed, for example, by routing database 240 by searching the data illustrated in FIG. 9B (e.g., screen received data, route to service provider customer, etc.). In some aspects, searching and/or using tables may include, for example, finding and/or matching information (data) included in the table. Routing database 240 may, for example, perform the steps illustrated in FIG. 9A after receiving a request from route proxy 230, the request including information identifying an origin and/or destination of a call session (e.g., telephone number, directory number, information identifying an origin rate center, local routing number, unique trunk group identifier, etc.). The routing database 240 may be configured to receive a request, access information responsive to the request, and/or transmit routing information responsive to the request. The routing database 240 may contain routing information, such as routing and/or mapping data (e.g., origination-based routing data, destination-based routing data, origination-based mapping data, default data, etc.) and policies, that allows the routing proxy 230 to proceed with routing the call to its destination. In one or more embodiments, the routing database 240 may be an intelligent routing database, such as an E.164 Number Mapping (ENUM) database.

In step 910, routing database 240 may screen received data for validity. For example, routing database 240 may verify that received origination information (e.g., telephone number, directory number, information identifying an origin rate center, local routing number, unique trunk group identifier, etc.) is provided in a format recognizable by the routing database. In some aspects of the disclosure, routing database 240 may perform data mapping so that the received data may be matched (e.g., compared) with information included in the routing database.

In step 920, routing database 240 may determine, based on received destination information, whether the destination is the same as or a peer of the call origin's service provider. A peer relationship may be established, for example, by a contractual relationship between a service provider and another service provider. Furthermore, a peer service provider may be on a different network from a service provider. In step 930, if a destination is a service provider user (e.g., customer) or peer (step 920: Yes), routing database 240 may determine a routing routine and/or next destination based on a result of searching, for example, the "Route to Service Provider customer" and/or "Route to Service Provider associate," tables (shown in FIG. 9B).

In step 940, routing database 240 may determine, based on received origination information (e.g., telephone number, directory number, information identifying an origin rate center, local routing number, unique trunk group identifier, etc.) or indicator information (e.g., a TGRP indicator), whether to route a call based on origination information. In step 940, if, based on received origination or indicator information, routing database 240 determines that origination-based routing is preferred (step 940: Yes), routing database 240 may determine a routing routine and/or next destination based on a result of searching, for example, "Route based on origination information" tables (shown in FIG. 9B). Furthermore, by searching and determining a match in the "Route based on origination information" tables, routing database 240 may determine that the next destination for a call session is an origination-based mapping table, which will be described more fully in FIGS. 10A and 10B.

In step 960, routing database 240 may determine, based on received information, whether to route a call based on destination information. In step 970, if, based on received information, routing database 240 determines that destination-based routing is preferred (step 960: Yes), routing database 240 may determine a routing routine and/or next destination based on a result of searching, for example, "Route based on destination information" tables (shown in FIG. 9B). For example, by searching and determining a match in the "Route based on destination information" data tables, routing database 240 may determine that the next destination for a call session is a call management element (e.g., one of call management servers 250A-C). Furthermore, if desired, all destination-based routed call sessions may be forwarded to the same call management element (e.g., call management server 250A).

In step 980, if no matches to the "Route to Service Provider user," "Route to Service Provider associate," "Route based on origination information" and "Route based on destination information" tables have been made, routing database 240 may determine a routing routine and/or next destination based on a result of searching, for example, the "Default Route" tables (shown in FIG. 9B). Default routing routines may include, for example, routines based on call type (e.g., local, toll, long-distance, international, etc.), routines based on origination and destination service providers (e.g., a call originating from a number that is licensed/owned/assigned by service provider A destined to another number licensed/owned/assigned by service provider A or to a number that is licensed/owned/assigned by service provider B), or least cost routing.

In each of steps 930, 950, 970 and 980, after determining the type of routing to perform, routing database 240 may determine the next destination for the call session. For example, routing database may determine an identifier (e.g., URI, etc.) for the next destination of a call session. Routing database 240 may send a response with the determined identifier to the route proxy 230. Alternatively, routing database 240 may send a list of possible routes and/or identifiers for the call session to the route proxy 230. Furthermore, one of ordinary skill in the art will appreciate that the steps illustrated in FIG. 9A may be performed in other than the recited order, and that one or more steps illustrated may be optional in accordance with aspects of the disclosure. For example, routing database 240 may determine whether to route based on origination information (e.g., step 940) prior to determining whether to route based on whether a destination is associated with the service provider or is a peer of the service provider (e.g., step 920).

FIG. 10A illustrates an example method for using origination-based mapping according to one or more aspects described herein. FIG. 10B illustrates an example origination-based mapping corresponding to the example method of FIG. 10A, according to one or more aspects described herein. The steps illustrated in FIG. 10A may be performed, for example, by routing database 240 by using the tables illustrated in FIG. 10B (e.g., extracted origination information (OI), next destination corresponding to OI, etc.). Routing database 240 may, for example, perform the steps illustrated in FIG. 10A after receiving a request from route proxy 230, the request including information identifying an origin and/or destination of a call session (e.g., telephone number, directory number, information identifying an origin rate center, local routing number, unique trunk group identifier, etc.).

In step 1010, routing database 240 may extract call origination information (e.g., telephone number, directory number, information identifying an origin rate center, local routing number, unique trunk group identifier, etc.) from a header and/or other data field of a received request. If the request is a SIP request, for example, call origination information may be extracted from one or more header fields of the SIP message, including, but not limited to, a trunk group header, a Diversion header, a P-asserted-identity (PAID) header, and a From header. Alternatively, call origination information might not include an origin local routing number. In this example, routing database 240 may derive an origin local routing number from other origination information included in the request (e.g., telephone number, directory number, information identifying an origin rate center, unique trunk group identifier, etc.). For example, origination-based mapping table 1001 may include an additional table for converting received call origination information (e.g., telephone number, directory number, information identifying an origin rate center, unique trunk group identifier, etc.) to a local routing number.

In step 1020, routing database 240 may determine the next destination of a call session based on extracted and/or derived call origination information. In particular, routing database may determine a call management element (e.g., one of call management servers 250A-C) corresponding to extracted and/or derived call origination information as the next destination of a call session. Furthermore, the call management element may be connected to one or more trunks or trunk groups of a PSTN or other network, so that a call may be routed based on origination information of the call. The call management element may be determined, for example, by using the "Next Destination corresponding to OI" tables shown in FIG. 10B.

In step 1030, routing database 240 may determine whether the next destination (identified in step 1020) is a valid next destination. An invalid next destination may include, for example, a destination that does not exist or is out of operation. In some arrangements, routing database 240 may determine validity based on information included in the routing database, such as configured information. In step 1040, if the next destination is valid (step 1030: Yes), routing database 240 may send a response to route proxy 230, including an indicator identifying a next destination (e.g., a URI for one of CMSs 250A-C). In some embodiments, the response may be a SIP response. In further embodiments, a next destination indicator may be included in a header field of a SIP response. In step 1050, if a determined next destination is invalid (step 1030: No), routing database 240 may send a response to route proxy 230 indicating that a next destination could not be determined from received origination information. Additionally or alternatively, routing database may use default tables (e.g., "Default Next Destination" tables shown in FIG. 10B) to determine a default next destination of a call session, such as a predetermined next destination. A default next destination may include, for example, a particular CMS (e.g., CMS 250A). In addition to CMSs, next destinations may include, for example, peers, information gateways such as media gateways, and/or destinations identified by an announcement.

Referring back to FIG. 2, call management servers 250A-C may be configured to receive and/or transmit information from a route proxy (e.g., route proxy 230), and/or interface with other networks to route the call. Other networks may include, for example, network 260, other wholesale carrier networks, telephony carrier networks, voice-over Internet Protocol (VoIP) carrier networks, etc. In the example shown in FIG. 2, call management servers 250A-C may interface with network 260 through trunks or trunk groups.

In some arrangements, call routing elements (e.g., IMS 210, route proxy 230, routing database 240, CMSs 250A-C) may be centrally located such as at a central office of the service provider (e.g., a single location). In other arrangements, the functions of the call routing elements may be distributed throughout the network of a service provider. For example, IMS 210, route proxy 230, routing database 240 and/or CMSs 250A-C may be at different locations remote from each other.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above.

In one or more arrangements, any and/or all of the steps of the example methods described herein may be performed by a computing device (e.g., computing device 300), performed by a plurality of computing devices operating as a computing system (e.g., a network), and/or embodied as computer-executable instructions stored on one or more non-transitory computer-readable media (e.g., a hard disk, a removable disk, memory, etc.). Furthermore, one of ordinary skill in the art will appreciate that the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

The invention claimed is:

1. A method comprising:
    selecting, by a routing computing device, based on a call session request, and to route a call session from an origin to a destination, origination information of the call session request, wherein the selecting comprises selecting between:
        the origination information of the call session request; and
        destination information of the call session request;
    determining, based on the origination information, a database, wherein the database maps a plurality of origins, comprising the origin of the call session, with a plurality of intermediate destinations comprising an intermediate destination;
    determining, using the database and the origination information, the intermediate destination; and
    routing, by the routing computing device, a call session toward the destination via the intermediate destination.

2. The method of claim 1, wherein the selecting comprises selecting, based on a header field of the call session request, between the origination information and the destination information.

3. The method of claim 1, wherein the intermediate destination is connected to a communication trunk of a network, and wherein the communication trunk corresponds to the origination information.

4. The method of claim 1, wherein the call session request comprises an indication of a routing type, and wherein the determining the database comprises selecting, based on the indication of the routing type, the database from a plurality of databases.

5. The method of claim 1, wherein the origination information comprises an indication of a rate center of an origin corresponding to the call session request.

6. The method of claim 1, wherein the call session request comprises a session initiation protocol (SIP) request, and wherein the selecting comprises selecting, based on a trunk group header field of the SIP request, between the origination information and the destination information.

7. A non-transitory computer-readable medium storing instructions that, when executed by one or more computing devices, cause:
    selecting, based on a call session request and to route a call session from an origin to a destination, origination information of the call session request, wherein the selecting comprises selecting between:
        the origination information of the call session request; and
        destination information of the call session request;
    determining, based on the origination information, a database, wherein the database maps a plurality of origins, comprising the origin of the call session, with a plurality of intermediate destinations comprising an intermediate destination;
    determining, using the database and the origination information, the intermediate destination; and
    routing the call session toward the destination via the intermediate destination.

8. The non-transitory computer-readable medium of claim 7, wherein the selecting comprises selecting, based on a header field of the call session request, between the origination information and the destination information.

9. The non-transitory computer-readable medium of claim 7, wherein the intermediate destination is connected to a communication trunk of a network, and wherein the communication trunk corresponds to the origination information.

10. The non-transitory computer-readable medium of claim 7, wherein the call session request comprises an indication of a routing type, and wherein the instructions, when executed, further cause the determining the database by at least:
    selecting, based on the indication of the routing type, the database from a plurality of databases.

11. The non-transitory computer-readable medium of claim 7, wherein the origination information comprises an indication of a rate center of an origin corresponding to the call session request.

12. The non-transitory computer-readable medium of claim 7, wherein the call session request comprises a session initiation protocol (SIP) request, and wherein the selecting comprises selecting, based on a trunk group header field of the SIP request, between the origination information and the destination information.

13. A system comprising:
a routing computing device; and
an intermediate destination device,
wherein the routing computing device comprises:
one or more processors; and
memory storing instructions that, when executed by the one or more processors, cause the routing computing device to:
select, based on a call session request and to route a call session from an origin to a destination, origination information of the call session request, by selecting between:
the origination information of the call session request; and
destination information of the call session request;
determine, based on the origination information, a database, wherein the database maps a plurality of origins, comprising the origin of the call session, with a plurality of intermediate destinations comprising the intermediate destination device;
determine, using the database and the origination information, the intermediate destination device; and
route the call session toward the destination via the intermediate destination device, and
wherein the intermediate destination device comprises:
one or more processors; and
memory storing instructions that, when executed by the one or more processors, cause the intermediate destination device to:
receive the call session from the routing computing device; and
further route the call session toward the destination.

14. The system of claim 13, wherein the instructions, when executed by the one or more processors, cause the routing computing device to select by selecting, based on a header field of the call session request, between the origination information and the destination information.

15. The system of claim 13, wherein the intermediate destination device is connected to a communication trunk of a network, and wherein the communication trunk corresponds to the origination information.

16. The system of claim 13, wherein the call session request comprises an indication of a routing type, and wherein the routing computing device is configured to determine the database by at least selecting, based on the indication of the routing type, the database from a plurality of databases.

17. The system of claim 13, wherein the call session request comprises a session initiation protocol (SIP) request, and wherein the instructions, when executed by the one or more processors, cause the routing computing device to select by selecting, based on a trunk group header field of the SIP request, between the origination information and the destination information.

18. The method of claim 1, wherein the call session request comprises an indication of a routing type, and wherein the selecting comprises selecting, based on the indication of the routing type, between the origination information and the destination information.

\* \* \* \* \*

UNITED STATES PATENT AND TRADEMARK OFFICE
CERTIFICATE OF CORRECTION

PATENT NO. : 11,736,837 B2
APPLICATION NO. : 16/442777
DATED : August 22, 2023
INVENTOR(S) : Kaushal et al.

Page 1 of 1

It is certified that error appears in the above-identified patent and that said Letters Patent is hereby corrected as shown below:

In the Specification

Column 11, Detailed Description, Line 17:
Delete "150A-C)," and insert --150A-B),-- therefor Signed and Sealed this
Twenty-ninth Day of October, 2024

Katherine Kelly Vidal
*Director of the United States Patent and Trademark Office*